United States Patent
Bianco et al.

(10) Patent No.: US 10,643,376 B2
(45) Date of Patent: May 5, 2020

(54) COMPUTER SYSTEM AND METHOD FOR IMPROVED GLOSS REPRESENTATION IN DIGITAL IMAGES

(71) Applicant: Universität Basel, Basel (CH)

(72) Inventors: Andrea Bianco, Füllinsdorf (CH); Peter Fornaro, Binningen (CH)

(73) Assignee: Universität Basel, Basel (CH)

( * ) Notice: Subject to any disclaimer, the term of this patent is extended or adjusted under 35 U.S.C. 154(b) by 0 days.

(21) Appl. No.: 16/190,856

(22) Filed: Nov. 14, 2018

(65) Prior Publication Data

US 2019/0080509 A1 Mar. 14, 2019

Related U.S. Application Data

(63) Continuation of application No. PCT/EP2016/067045, filed on Jul. 18, 2016.

(51) Int. Cl.
*G06T 15/50* (2011.01)

(52) U.S. Cl.
CPC ........ *G06T 15/506* (2013.01); *G06T 2200/21* (2013.01)

(58) Field of Classification Search
CPC .......................... G06T 15/506; G06T 2200/21
See application file for complete search history.

(56) References Cited

U.S. PATENT DOCUMENTS

| | | | | |
|---|---|---|---|---|
| 7,091,973 B1* | 8/2006 | Cohen | ..................... | G06T 15/50 345/426 |
| 2003/0011596 A1* | 1/2003 | Zhang | .................. | G06T 15/506 345/426 |
| 2003/0076320 A1* | 4/2003 | Collodi | ................... | G06T 15/50 345/426 |
| 2009/0279807 A1* | 11/2009 | Kanamorl | ............ | G02B 5/3025 382/274 |

(Continued)

OTHER PUBLICATIONS

Agusanto, Kusuma, "Photorealistic rendering for augmented reality using environment illumination", Oct. 2003, IEEE, pp. 208-216 (Year: 2003).*

Debevec, Paul, "Estimating Surface Reflectance Properties of a Complex Scene under Captured Natural Illumination", Jan. 2004, ACM (Year: 2004).*

(Continued)

*Primary Examiner* — Terrell M Robinson
(74) *Attorney, Agent, or Firm* — Brake Hughes Bellermann LLP

(57) ABSTRACT

A computer-implemented image processing method, system, and computer program product for representation of static objects in a digital target image including a plurality of target pixels. The method includes at least receiving a plurality of digital source images of the static objects, computing diffuse components for target pixels of surface elements by computing for each target pixel of the surface elements a set of diffuse reflection coefficients from a best-fit function when fitted into reflected light intensity values of corresponding source pixels of the source images under different illumination angles, generating normal vectors for the target pixels by using the computed diffuse reflection (Continued)

coefficients, and determining glossy coefficients for the target pixels of the one or more surface elements as the distances between the corresponding best-fit function values and the reflected light intensity values of the corresponding source pixels for the different illumination angles.

20 Claims, 6 Drawing Sheets

(56) References Cited

U.S. PATENT DOCUMENTS

| | | | | |
|---|---|---|---|---|
| 2010/0289878 A1* | 11/2010 | Sato | ............ | H04N 13/239 348/46 |
| 2010/0328677 A1* | 12/2010 | Debevec | ............ | G01N 21/55 356/600 |
| 2011/0102551 A1* | 5/2011 | Iwasaki | ............ | G06T 3/40 348/46 |
| 2014/0268160 A1* | 9/2014 | Debevec | ............ | G01N 21/55 356/445 |

OTHER PUBLICATIONS

International Search Report and Written Opinion from International Appln. No. PCT/EP2016/067045, dated Apr. 13, 2017, 14 pages.

Drew et al.: "Robust estimation of surface properties and interpolation of shadow/specularity components", Image and Vision Computing, Elsevier, Guildford, GB, vol. 30, No. 4, Feb. 29, 2012, pp. 317-331.

Malzbender et al.: "Polynomial Texture Maps", ACM SIGGRAPH, 2 Penn Plaza, Suite 701, NY, USA, Aug. 12-17, 2001, pp. 519-528.

Mudge et al.: "Image-Based Empirical Information Acquisition, Scientific Reliability, and Long-Term Digital Preservation for the Natural Sciences and Cultural Heritage", EUROGRAPHICS, 2008, 30 pages.

Mudge et al.: "Principles and Practices of Robust, Photography-based Digital Imaging Techniques for Museums", 11th International Symposium on Virtual Reality, Archaeology and Cultural Heritage VAST, 2010, pp. 111-137.

Malzbender et al.: "Polynomial texture maps," Proceedings of the 28th annual conference on Computer graphics and interactive techniques, 2001, pp. 519-528.

* cited by examiner

COMPUTER SYSTEM AND METHOD FOR IMPROVED GLOSS REPRESENTATION IN DIGITAL IMAGES

CROSS REFERENCE TO RELATED APPLICATION

This application claims priority to, and is a continuation of PCT/EP2016/067045, filed on Jul. 18, 2016 and entitled "COMPUTER SYSTEM AND METHOD FOR IMPROVED GLOSS REPRESENTATION IN DIGITAL IMAGES" the entirety of which is hereby incorporated by reference.

TECHNICAL FIELD

The present disclosure generally relates to electronic data processing, and more particularly, relates to methods, computer program products and systems for digital image processing.

BACKGROUND

Photography in the analog as well as in the digital world allows for the representation of physical objects and their visual appearance. However, photography, including digital photography, has some drawbacks. Photography is not able to visualize dynamic interaction of light with surfaces, since it is a static method to capture light reflection of materials and objects. For example, this may be disadvantageous for the representation or documentation of any kind of surface structure, be it art-works, objects in forensics, dermatology, archaeology or for high quality product visualization (e.g., for promoting products).

RTI is a set of computational photographic methods that capture a subject's surface shape and color and enables the interactive re-lighting of the subject from any direction based on a mathematical model, such as Polynomial Texture Mapping (PTM). The reflection of light is, in a first step, captured by multiple photo images, where objects are illuminated by a light source from different positions (under different illumination angles). For example, the light source may be a flash light (or a LED light) which is synchronized with the digital camera to illuminate the static objects when a digital (source) image is recorded. In a second step, a polynomial of second order is fitted to the measured reflection for each pixel position. However, PTM has limitations of the mathematical model that is applied. A second order polynomial is able to reproduce reflection of diffuse (matte) surfaces, also called Lambertian surfaces, but reproduction of gloss is not possible.

SUMMARY

There is therefore a need for an approach to improve conventional techniques in that reproduction of gloss is enabled for photographic representation of objects with glossy surface elements.

A Lambertian surface scatters the incoming light in such a way that the apparent brightness does not depend on the observer's point of view. Although the radiance of the surface depends on the angle between the normal and the illuminating light source, following the Lambertian cosine law, it does not depend on the angle between the normal and the observer: it has a uniform reflection (e.g., like a matte surface). Differently, a glossy surface has a component of specular reflection. Specularity means, that light is reflected only in one direction, defined by the law of reflection (also called Snell law), a mirror shows a perfect specular reflection. The limitation of the PTM second order polynomial for the reproduction of objects that are made of one single or multiple materials needs to be overcome. An object surface element interacts with light and in most cases diffuse and glossy materials constitute the object and give it is characteristic look. In other words, one and the same object may have surface elements made of diffuse materials and may also have surface elements made of glossy materials.

The above technical problem is solved by an image processing method, a corresponding computer program product to be executed by a computer system to perform the image processing method, and by a computer system according to the independent claims.

In some embodiments, an image processing computer system is provided for rendering one or more static object representations (i.e., representations of one or more static objects) in a digital target image including a plurality of target pixels. The digital target image is the result of the image processing method which is executed by the computer system by processing a plurality of source images. The one or more static objects have surface elements with different surface reflectance properties. The static objects are real world physical objects whose visible surface elements may be composed of different materials (e.g., glass, wood, stone, etc.) having different reflectance properties.

The system has an interface component to receive the plurality of digital source images of the one or more static objects wherein each source image of the plurality represents the one or more static objects under a constant viewing angle and under a different illumination angle. For example, a digital camera may be located a fixed position. The camera is directed to the static object(s) under a constant viewing angle. The static object(s) are illuminated by a light source (advantageously a directed light source). For each source image, the light source is moved to a different position so that each source image is recorded under a different illumination angle.

The system further has an image generator component to perform the computation steps required to arrive at the improved target image. The computation tasks are performed by one or more processor components of the systems. In a first step, the image generator computes diffuse components for target pixels of one or more surface elements by computing for each target pixel of the one or more surface elements a set of diffuse reflection coefficients from a best-fit function when fitted into reflected light intensity values of corresponding source pixels of the source images under different illumination angles. In the PTM approach, this step is performed with a second order polynomial as the best-fit function. However, any other appropriate mathematical best-fit function may be used instead, such as for example, an algebraic or geometric best-fit function selected from the group of: higher order polynomial function, conic section function, trigonometric function, Gaussian function, Lorentzian function, Voigt function, or any other potential best-fit function known by a person skilled in the art.

In a second step, the image generator generates normal vectors for the target pixels of the one or more surface elements by using the computed diffuse reflection coefficients. The normal vectors describe the spatial orientations of the one or more surface elements. In other words, the image generator determines for each pixel of a corresponding particular surface element an orientation vector (normal vector) which is orthogonal to a plane of the surface element in each respective pixel.

In a third step, the image generator determines glossy coefficients for the target pixels of the one or more surface elements as the distances (i.e., value differences) between the corresponding best-fit function values and the reflected light intensity values of the corresponding source pixels for the different illumination angles. In other words, a distance between a particular reflected light intensity value for a particular pixel position and the respective best-fit function value indicates that the model for the diffuse components derived from the source images is inaccurate for the particular pixel position. The distance from the best-fit function value can be seen as an indicator for gloss which is present at the particular pixel position.

In a forth step, the image process generates glossy components for the target pixels of the one or more surface elements by overlaying a computer graphics shading and reflection model in accordance with the corresponding normal vectors and the determined glossy coefficients. Such reflection models are known in the art of computer graphics and various reflection models may be used to compute gloss. Examples of reflection models include the Phong reflection model, Cook-Torrance model, Ward anisotropic model, and Gaussian models.

After this step, the image processing method provides the information for rendering a particular target image. It is to be noted that the target image can be rendered for any illumination angle because the diffuse and glossy components are models providing pixel values for the target image for a continuum of illumination angles although the original source images provided pixel values only for a plurality of discrete illumination angles under which the respective source images were recorded.

The system typically has a rendering component configured to render the target image with the computed diffuse components and glossy components for the constant viewing angle and a first illumination angle. For example, the solution can be implemented with the commonly known graphics libraries, openGL or WebGL (provided by Khronos Group, Beaverton, USA) to render RTI images in any web-browser. A web-based solution opens various new applications and the possibility for collaborative work.

The rendering component further may re-render the target image with the computed diffuse components and glossy components for the constant viewing angle and a second (or further) illumination angle(s). That is, the target image can be visualized for any illumination angle from the continuum of illumination angels associated with the diffuse/glossy component models.

In some embodiments, a mobile computing device (e.g., a smartphone or a tablet computer) can be used to implement and run the previously disclosed image processing system. The mobile device may include one or more orientation sensors (e.g., gravity sensor, acceleration sensor, gyroscope, etc.). For example, a user of the mobile device may now move (tilt or incline) the mobile device so that the orientation sensor(s) provide sensor data reflecting the current orientation of the mobile device. The mobile device can then derive the first and second illumination angles from first and second sensor data from the one or more orientation sensors wherein the first and second sensor data is associated with first and second orientations of the mobile computing device, respectively. In other words, a user inclining the display can initiate the generating of orientation sensor data in response to his movements which is then used as a trigger for re-rendering the target image for respective illumination angles mapped to the sensor data.

In some embodiments, the system further includes a material detection component configured to identify one or more different materials associated with the one or more surface elements wherein similar visual appearance of a material is determined through similar reflectance properties.

In some embodiments, a computer-implemented image processing method is provided for representation of one or more static objects in a digital target image. The method includes receiving a plurality of digital source images of the one or more static objects wherein each source image of the plurality represents the one or more static objects under a constant viewing angle and under a different illumination angle, computing diffuse components for target pixels of one or more surface elements by computing for each target pixel of the one or more surface elements a set of diffuse reflection coefficients from a best-fit function when fitted into reflected light intensity values of corresponding source pixels of the source images under different illumination angles, generating normal vectors for the target pixels of the one or more surface elements by using the computed diffuse reflection coefficients wherein the normal vectors describe the spatial orientations of the one or more surface elements, determining glossy coefficients for the target pixels of the one or more surface elements as the distances between the corresponding best-fit function values and the reflected light intensity values of the corresponding source pixels for the different illumination angles, and generating glossy components for the target pixels of the one or more surface elements by overlaying a computer graphics reflection model in accordance with the corresponding normal vectors and the determined glossy coefficients.

The method provides the diffuse and glossy components for the target pixels of the target picture which can then be assembled into a particular target picture for an arbitrary illumination angle within the range of illumination angles supported by the best-fit function values on the basis of the original source images.

The method may further include the optional step rendering the target image with the computed diffuse components and glossy components for the constant viewing angle and a first illumination angle.

The method may further include the optional step re-rendering the target image with the computed diffuse components and glossy components for the constant viewing angle and a second illumination angle. Thereby, rendering and re-rendering may be performed by a mobile computing device having one or more orientation sensors. The first and second illumination angles can be derived from first and second sensor data from the one or more orientation sensors wherein the first and second sensor data is associated with first and second orientations of the mobile computing device, respectively.

The method may be iteratively repeated for at least one further constant viewing angle. For example, the plurality of source images may include a first set of source images associated with a first constant viewing angle and a second of further set of source images associated with a second or further viewing angles. In this embodiment it is possible to virtually move around the static object(s) by switching from a target image rendered for the first viewing angle to a target image rendered for the second (or further) viewing angles.

In some embodiments, generating glossy components is performed only for target pixels with glossy coefficients exceeding a predefined threshold value. In other words, the predefined threshold functions as a filter to eliminate gloss components which may result from errors in the original source images. Distances of the light reflection intensity from the respective best-fit function values which are below the predefined threshold may be perceived as such errors which can be suppressed by the threshold filter function.

In some embodiments, the method further includes receiving modified reflection parameters for the reflection model wherein the modified parameters represent the surface reflectance properties of the surface elements. For example, a user may enter such modified reflection parameters to further improve the target picture with regards to the gloss effects. In some cases, a target image may become less realistic compared to the real world situation of the static objects but it may be perceived more aesthetic by a human observer.

In some embodiments, the method further includes identifying one or more different materials associated with the one or more surface elements wherein similar visual appearance of a material is determined through similar reflectance properties. In other words, the image processing method can identify surface elements in the target image which show similar reflectance properties and classify such surface elements as similar materials.

In some embodiments, a computer program product includes a set of instructions that when loaded into a memory of a computing device and executed by at least one processor of the computing device execute the steps of the above computer-implemented image processing method.

Further aspects of the described subject matter will be realized and attained by means of the elements and combinations particularly depicted in the appended claims. It is to be understood that both, the foregoing general description and the following detailed description are exemplary and explanatory only and are not restrictive of the claimed subject matter, as described.

DETAILED DESCRIPTION

Figure 1:
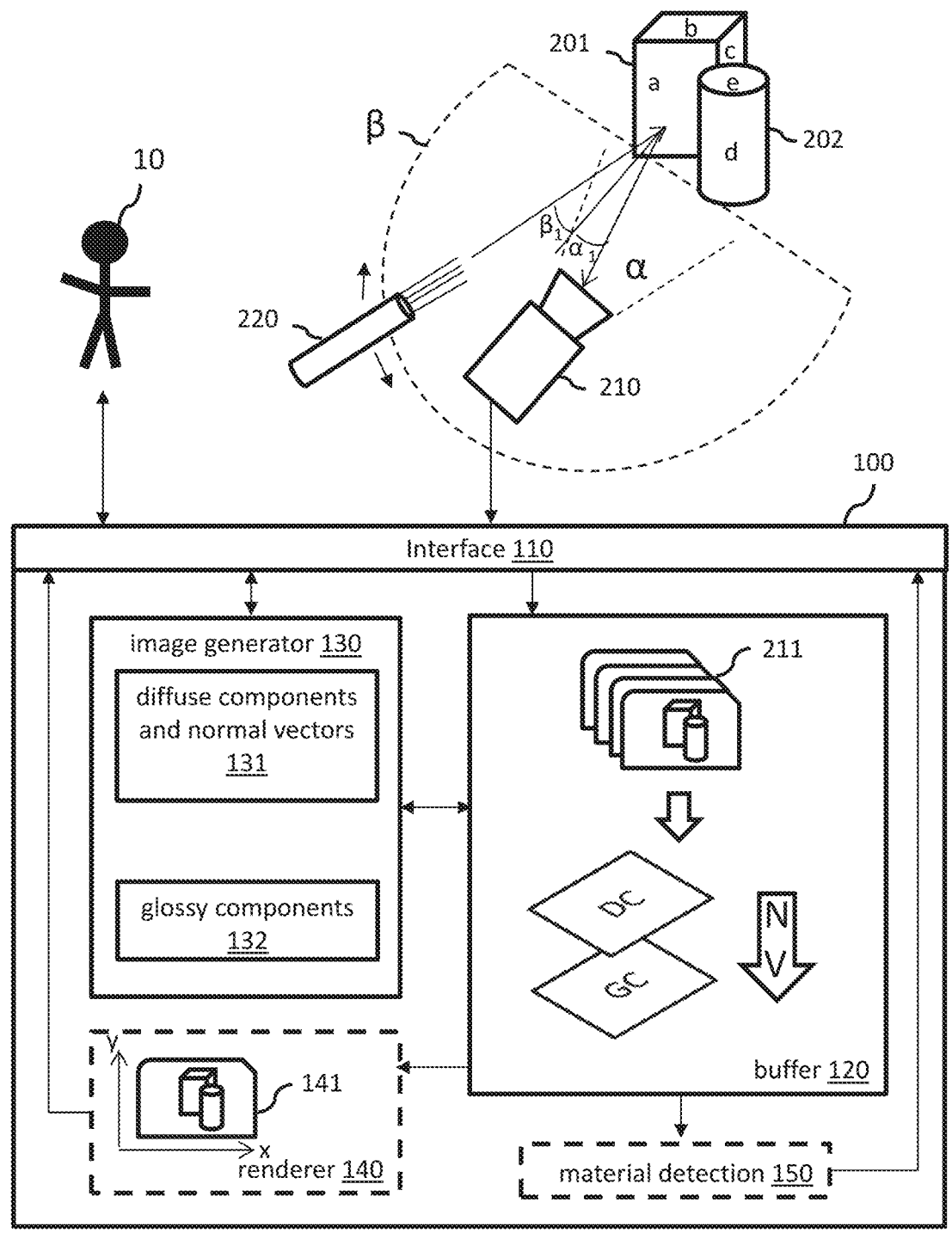
FIG. 1 is a simplified block diagram showing an image processing computer system for generating a digital target image from a plurality of source images received from a digital camera.
Figure 2:
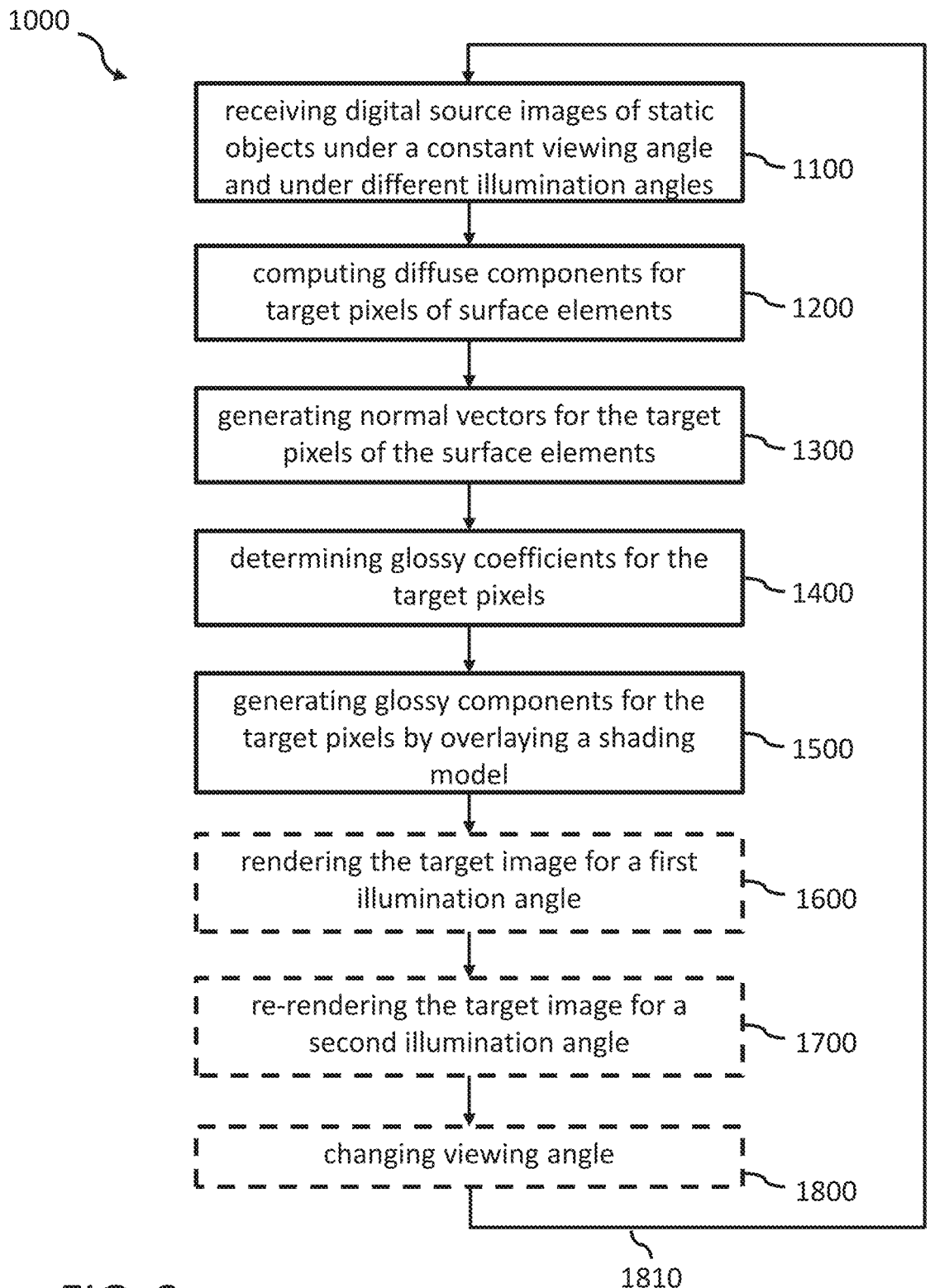
FIG. 2 is a simplified flow chart of a computer-implemented image processing method for representation of one or more static objects in a digital target image.

FIG. 1 illustrates a simplified block diagram of an image processing computer system 100. FIG. 1 is explained in the context of FIG. 2 which is a simplified flow chart of a computer-implemented image processing method 1000 according to one embodiment for representation of one or more static objects in a digital target image. The following part of the description uses reference numbers which refer to FIG. 1 and to FIG. 2. The terms "source" and "target" may refer to pixels/images before and after processing, respectively.

The computer system is communicatively coupled with a digital camera 210. The camera 210 is positioned at a location from where it can take digital images of one or more static objects 201, 202 under a constant viewing angle a (angle between the dashed straight lines evading from the camera). The objects are static in the sense that they do not move. In the example, the two static objects 201, 202 have surface elements a, b, c, d, e. Some of the surface elements may have different surface reflectance properties. For example, the surface elements b, e may be wooden parts, the surface elements a, c may be glass plates, and the surface element d may be an aluminum cylinder. Each of those materials has totally different reflectance properties. The static objects are illuminated by a light source 220. The light source 220 can have varying positions as illustrated by the dashed segment of a circle indicating the various light source positions associated with respective illumination angles β. Any other geometric shape allowing the light source to illuminate the static objects under different illumination angles may be used as well. In the example, each position of the light source on the circle segment corresponds to a particular illumination angle β. At the current position, the light source 220 emits light to the surface element of the static object 201 under an illumination angle $β_1$. The reflected light is received by the camera at a corresponding pixel under the viewing angle $α_1$. In this case, the incident angle $β_1$ equals the angle of reflection $α_1$. For example, the light source may be moved from left to right on the dashed circle segment with stops appropriate for the camera 210 to take an image of the static objects under the respective illumination angle. For example, the light source may be a remote flash light communicatively coupled with the camera 210 so that the illumination of the static objects is synchronized with the exposure time of the camera. In other words, during the exposure time for taking a particular source image, the light source remains at a fixed location. For example, the camera may take between 10 and 100 images wherein each image is recorded under a different illumination angle.

The plurality of recorded camera images are then received 1100 by an interface component 110 of the system 100 as a plurality 211 of digital source images (of the static objects 201, 202). Each source image of the plurality 211 represents the static objects under the constant viewing angle α and under a different illumination angle β (different light source positions). As illustrated, the images have pixel sub-sets of source pixels that represent the surface elements a, b, c, d and e. The interface component 110 may also provide standard input/output means (e.g., display means and data input means) for a user 10 to interact with the system 100.

The computer system 100 further has an image generator 130 for generating image data which is suitable for rendering a digital target image 141 including a plurality of target pixels. The image generator 130 includes at least two functions: a diffuse components and normalized vector function 131 and a glossy components function 132.

The diffuse components and normalized vector function 131 computes 1200 diffuse components DC for target pixels of one or more surface elements a, b, c, d, e by computing for each target pixel of the one or more surface elements a set of diffuse reflection coefficients from a best-fit function (reflection model) when fitted into reflected light intensity values of corresponding source pixels of the source images under different illumination angles. Any appropriate mathematical best-fit function, e.g., algebraic or geometric best-fit function such as, for example, second or higher order polynomial function, conic section function, trigonometric function, Gaussian function, Lorentzian function, or Voigt function may be used. For example, to estimate the diffuse components of the surface elements the following two dimensional function $f_{matte}$) can be used:

$$f_{matte}(l_u,l_v,x,y) = p_1^{(x,y)} l_u^2 + p_2^{(x,y)} l_v^2 + p_3^{(x,y)} l_u l_v + p_4^{(x,y)} l_u + p_5^{(x,y)} l_v + p_6^{(x,y)} \quad (1)$$

or $$f_{matte}(l_u,l_v,x,y) = p_1^{(x,y)} l_u^3 + p_2^{(x,y)} l_v^3 + p_3^{(x,y)} l_u^2 l_v + p_4^{(x,y)} l_v^2 l_u + p_5^{(x,y)} l_u^2 + p_6^{(x,y)} l_v^2 + p_7^{(x,y)} l_u l_v + p_8^{(x,y)} l_u + p_9^{(x,y)} l_v + p_{10}^{(x,y)} \quad (2)$$

defined by n parameters (diffuse reflection coefficients) $p_i^{(x,y)}$, i:1, . . . n where the pair of coordinates (x,y) represents a single pixel in the source images/target image and $l_u$, $l_v$ are the coordinates of the normalized vector describing the light direction (illumination angle) as described in T. Malzbender, D. Gelb, and H. Wolters, Polynomial texture maps, Proceedings of the 28th annual conference on Computer graphics and interactive techniques (pp. 519-528), (2001). Using a two dimensional reflection model allows to significantly reduce the computational burden for the computer system 100 when generating the target image from the source images because the computational effort is lower compared to a three-dimensional model. Interpolating the best-fit function for arbitrary 3-D light direction is very expensive in terms of memory and computational power. The reduction to a two-dimensional reflection model is possible when assuming that the light source is always at the same distance to the static objects. That is, the light source is moved along a circle with the static object(s) being at the center of the circle. This assumption holds if the circle, where the light source moves, is big enough compared to the object acquired. Experiments show that advantageously, the circle radius is approximately two or more times the object dimensions.

To estimate the diffuse characteristics of matte surface elements, only the fitted parameters are used and the coordinates of the normal vectors indicating the orientation of the surface elements at the respective pixel positions are obtained 1300 as a by-product of the diffuse component computation.

In more detail, the normal vectors NV can be generated 1300 for the target pixels of the one or more surface elements a, b, c, d, e by using the computed diffuse reflection coefficients $p_i^{(x,y)}$, i: 1, . . . , n wherein the normal vectors NV describe the spatial orientations of the one or more surface elements. The normal vectors can be extracted from the best-fit function in the following way. Given the best-fit function f (x, y, $l_u$, $l_v$), setting:

$$\frac{\partial f}{\partial l_u} = \frac{\partial f}{\partial l_v} = 0 \quad (3)$$

two values $l_{u0}$ and $l_{v0}$ are obtained for each pixel (x, y). The two obtained values are used to calculate the corresponding normal vector using the example formula:

$$\vec{N} = (l_{u0}, l_{v0}, \sqrt{1 - l_{u0}^2 - l_{v0}^2}). \quad (4)$$

The glossy components function 132 can then determine 1400 glossy coefficients for the target pixels of the one or more surface elements as the distances between the corresponding best-fit function values and the reflected light intensity values of the corresponding source pixels for the different illumination angles, and generates glossy components GC for the target pixels of the one or more surface elements a, b, c, d, e by overlaying a computer graphics reflection model in accordance with the corresponding normal vectors and the determined glossy coefficients.

For each pixel a set of n coefficients is obtained. The distance between the $f_{matte}$ best-fit function value and the intensity of the pixel for all illumination angles is computed for each target pixel. To do so a function is defined as:

$$f_G(x, y) = \frac{1}{N} \sum_{(l_u,l_v)} (f_{matte}(l_u, l_v, x, y) - I((l_u, l_v), x, y))^2 \quad (5)$$

or $$f_G(x, y) = \frac{1}{M} \sum_{(l_u,l_v)} |f_{matte}(l_u, l_v, x, y) - I((l_u, l_v), x, y)|^3 \quad (6)$$

where N and M are normalization factors, and $$I((l_u,l_v), x, y) \quad (7)$$

represents the intensity of the pixel (x, y) in the image defined by the light source (lu,lv). This function has values between zero and one on all the pixels and is used as a glossy coefficient. The $f_G(x, y)$ coefficient varies between zero and one.

A specific cut is made using the values of the mean value of the intensity:

$$meanvalue(x, y) = \frac{1}{N_p} \sum_{(l_u,l_v)} I((l_u, l_v), x, y) \quad (8)$$

or the variance of the intensity:

$$variance(x, y) = \frac{1}{N_p} \sum_{(l_u,l_v)} (I((l_u, l_v), x, y) - meanvalue(x, y))^2 \quad (9)$$

where $N_p$ is a normalization factor.

The optional rendering component 140 can render 1600 the target image 141 with the computed diffuse components DC and glossy components GC for the constant viewing angle α and a first illumination angle. The rendered image can be visualized to a user 10 of the system 100 through the interface 110 via appropriate presentation means (e.g., a display device). Although the interface 110 is shown as a single component it may provide multiple interfaces for different purposes where a communication with external entities is required. Alternatively, the rendering component 140 may also be implemented in a further system which is communicatively coupled with the system 100. The rendering component can also re-render 1700 the target image 141 with the computed diffuse components and glossy components for the constant viewing angle α for a second illumination angle. This includes re-rendering the target image for an arbitrary illumination angle because the best-fit function provides a continuum of values for any illumination angle in the range of the best-fit function.

If the received source images include a subset of images for a further viewing angle which are processed by the image generator 130 accordingly, the rendering component 140 may also switch to rendering a target image for this further viewing angle. In some embodiments, a mobile computing device (e.g., smartphone, tablet computer, etc.) which includes one or more orientation sensors may be used to run the system 100. In this case, the user 10 can use the user interface functions of the mobile device to interact with the system 100. For example, the inclination angle of the mobile device may be determined by the orientation sensor(s) and first and second or further illumination angles can be derived from first and second or further sensor data from the one or more orientation sensors. Automatic re-rendering of the target image can be triggered when the user generates corresponding illumination angle inputs for the rendering component 140 by moving the mobile device accordingly. Thereby, there is no need that the inclination angle of the mobile device corresponds to the actual illumination angle. For example, the user may hold the mobile device in a horizontal position and move the edges of the device up and down. The respective sensor data can then be transformed into illumination angles which correspond to a situation where the static object was in a vertical position and the light source was moved around the object in a horizontal plane.

The optional material detection component 150 can identify one or more different materials associated with the one or more surface elements a, b, c, d, e wherein similar visual appearance of a material is determined through similar reflectance properties. A detailed example is discussed in the context of FIGS. 4 to 6.

Figure 3A:
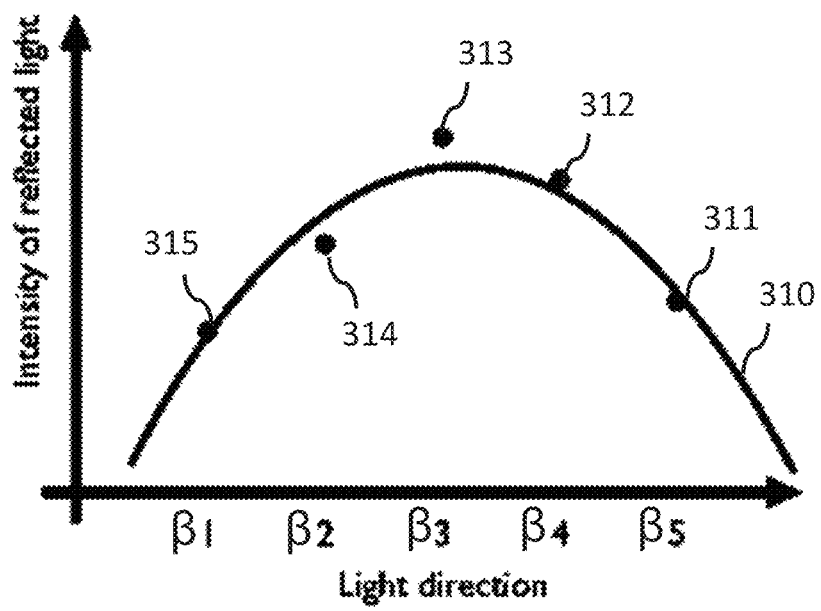
FIG. 3A illustrates a best-fit function for a diffuse surface reflection scenario.

FIG. 3A illustrates a best-fit function 310 for a diffuse surface reflection scenario, for a particular pixel. In this example, five source images of a static object are recorded at five different light source positions under five different illumination angles (illustrated by the light direction representations $\beta_1$ to $\beta_5$). The intensity of the light reflected by the static object as detected by the camera is illustrated by the bullets 311 to 315. The best-fit function 310 which represents the diffuse reflectance properties of the reflecting static object at the given pixel is fitted into the measured intensity values 311 to 315. The distances of the measured intensity values 311 to 315 to the best-fit function in this scenario are insignificant and can be considered to within the expected error tolerances. As a conclusion, the system recognizes that the surface element which is represented by the given pixel in the source images is a matte surface element whose reflectance properties can be well modeled by the diffuse reflectance model in the form of the best-fit function 310.

Figure 3B:
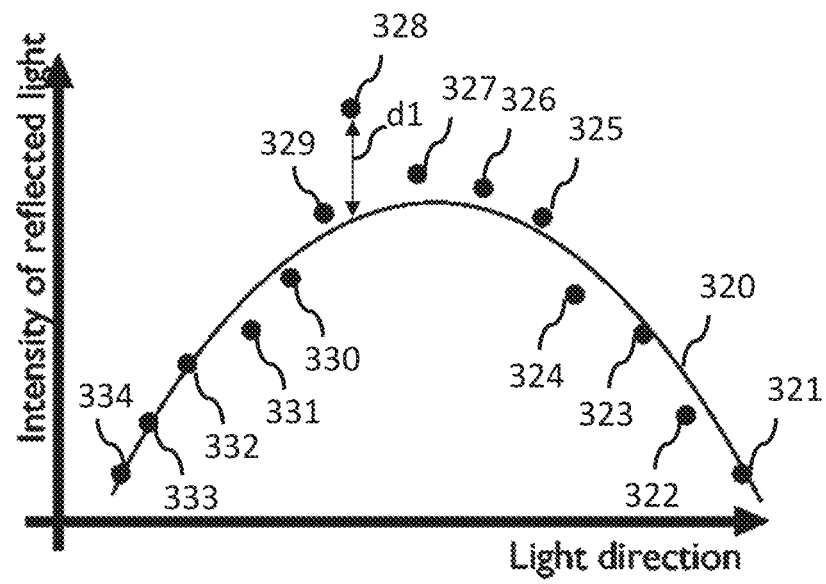
FIG. 3B illustrates a best-fit function for a glossy surface reflection scenario.

FIG. 3B illustrates a best-fit function 320 for a glossy surface reflection scenario. In this example, fourteen source images of a static object are recorded at fourteen different light source positions under fourteen different illumination angles. The intensity of the light reflected by the static object as detected by the camera is illustrated by the bullets 321 to 334 for a particular pixel. The best-fit function 320 which represents the diffuse reflectance properties of the reflecting static object at the particular pixel is fitted into the measured intensity values 321 to 334. The distances of the measured intensity values 321 -327 and 329-334 to the best-fit function in this scenario are insignificant and can be considered to within the expected error tolerances. However, the intensity value 328 has a significant distance dl from the best-fit function 320 which indicates that for the corresponding illumination angle a reflection condition is fulfilled by the reflecting surface element of the static object. In other words, under this illumination angle the angle of incidence is equal to the angle of reflection (cf. FIG. 1, $\beta_1$, $\alpha_1$) which leads to the significant increase in the intensity of the reflected light if the surface element has a reflecting surface and not a matte surface. As a conclusion, the system recognizes that the surface element which is represented by the particular pixel in the fourteen source images is a glossy surface element whose reflectance properties cannot be appropriately modeled by the diffuse reflectance model in the form of the best-fit function 320. The information that for the intensity value 328 the illumination angle (incident angle) equals the angle of reflection (which is correlated with the viewing angle of the camera) can be used by the normal vector function of the image generator to determine the normal vector associated with the reflecting surface element for determining the spatial orientation of the reflecting surface element as disclosed earlier.

Figure 4:
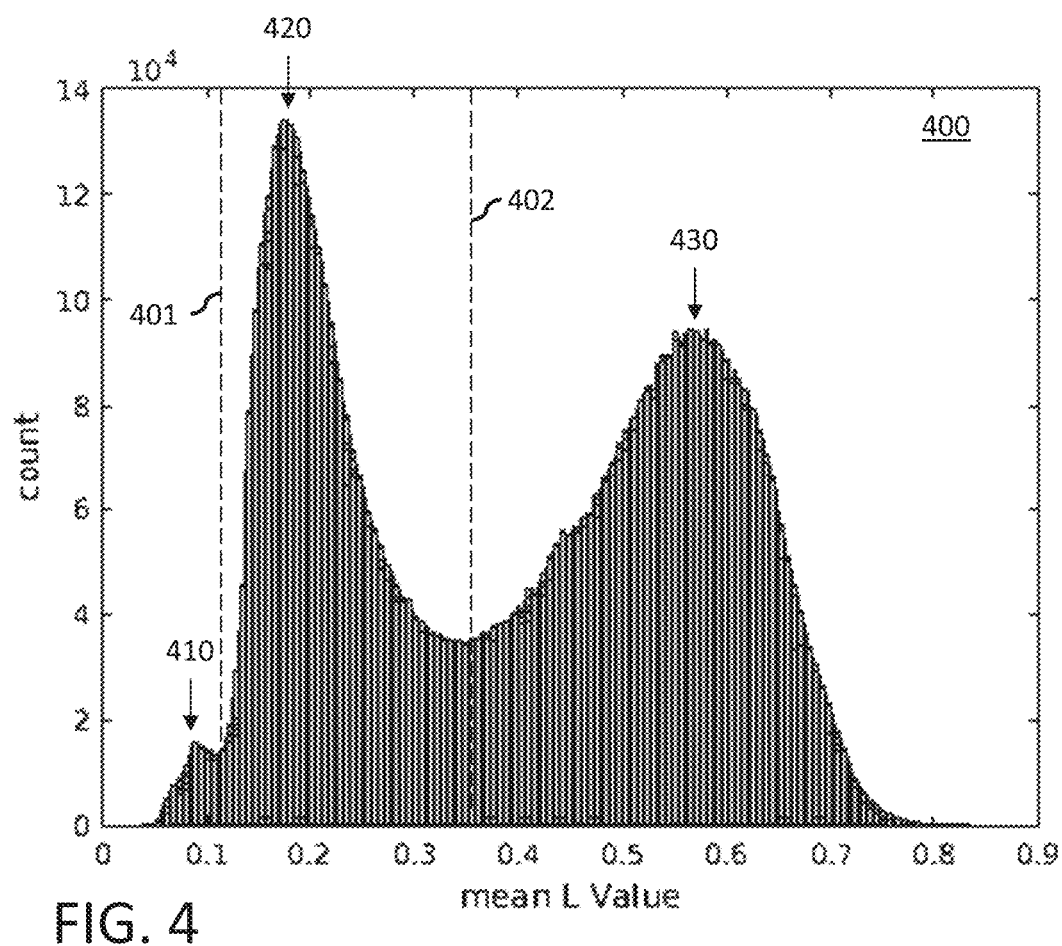
FIG. 4 is a histogram for identifying material filtering threshold values from source images.

FIG. 4 is a histogram 400 for identifying material filtering threshold values 401, 402 from source images. The histogram 400 may be generated by the material detection component by analyzing the pixels of the source images in the following way. For each pixel the material detection component determines a mean luminance value (mean L value). Looking at equation (8) shows that the mean value is normalized. Np is not just the number of points, but the number of points multiplied by the maximum value of L for a particular pixel. For example, if the pixel values are "1,5,6,7,8" Np is 8*5=40, and the mean value is 0.675. Alternatively, a fixed value for the maximum can be used. For example, the pixel value may be fixed between 1 and 10. In case the pixel values are "1,5,6,7,8", Np can be 10*8 and the mean value can be 0.3375.

For example, in case the light source provides white light, any color channel of the original RGB signal may be used because it is assumed that the luminance value is independent of the color channel. The mean value is determined by adding the L values for a particular pixel across all source images and dividing the sum by a normalization factor. Then, the number of pixels having the same mean L values is counted. This count is then entered into the histogram for the respective mean L values. In the example, three peaks 410, 420, 430 can be identified in the histogram 400. Each peak represents a particular reflectance property of the surface elements appearing on the source images. That is, the respective surface elements of the static objects have different surface properties indicating different materials. The material detection component can then determine material filtering threshold values 401, 402 from the histogram 400 as the minima of the histogram. For example, mean L values below or equal the first material filtering threshold value 401 (first filtering range) relate to a material associated with the peak 410. Mean L values above the first material filtering threshold value 401 and below or equal to the second material filtering threshold value 402 (second filtering range) relate to a material associated with the peak 420. Mean L values above the second material filtering threshold value 402 (third filtering range) relate to a material associated with the peak 430. Although the material detection component cannot determine the various types of material without an additional corresponding mapping between mean L values and the respective material types it can distinguish between different materials on the basis of the determined filtering ranges.

Figure 5:
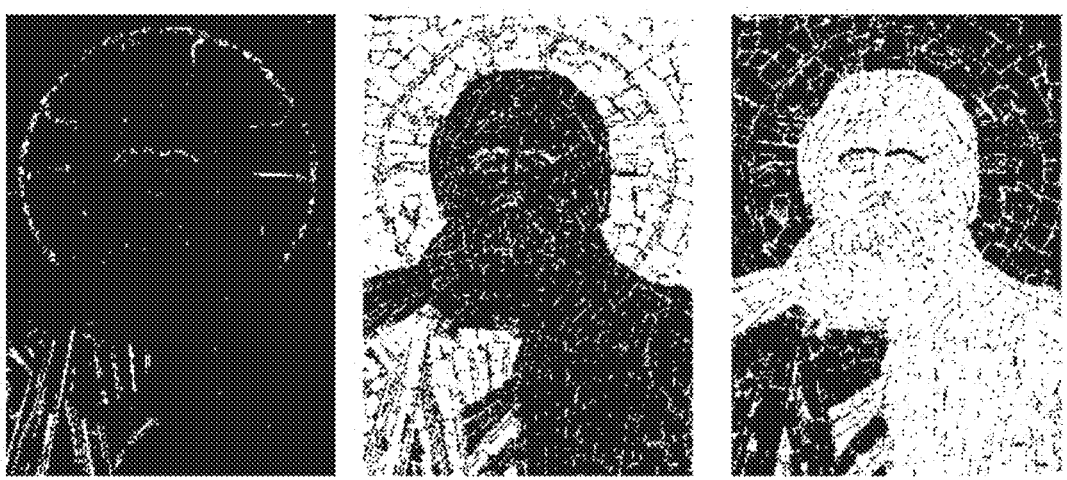
FIG. 5 illustrates three images with different material filtering threshold values applied.

FIG. 5 illustrates three images A, B, C with different material filtering threshold values applied. Image A illustrates the result of applying the first filtering range to an image of a mosaic wherein the different elements of the mosaic include different materials with different reflectance properties. In the example, the filtering function performed by the material detection component sets the pixel values of all pixels having a mean L value within the first filtering range to WHITE. Pixels with mean L values outside the first filtering range are set to BLACK. Any other pair of colors (or gray scale) may be used instead. In other words, the white pixels indicate the positions of mosaic elements with a corresponding first material type.

Image B shows the result after the application of the second filtering range. That is, mosaic elements made of a material which corresponds to mean L values within the second filtering range are shown as WHITE pixels, whereas pixels with mean L values outside the second filtering range are shown as BLACK pixels.

Image C shows the result after the application of the third filtering range. That is, mosaic elements made of a material which corresponds to mean L values within the third filtering range are shown as WHITE pixels, whereas pixels with mean L values outside the third filtering range are shown as BLACK pixels.

In some embodiments, each filtering range can be mapped to a corresponding visualization color for the respective material. That is, in the present scenario, three different colors (e.g., BLACK, WHITE, GRAY or RED, GREEN, BLUE or any other combination) would be used to visualize the three materials within a single image. For example, in this embodiment a user may get an overview in a single image of how many different materials are used within the mosaic. The previous embodiments, as shown in the images A,B, and C can then be activated as a drill down option when selecting any one of the materials (e.g., by clicking on a respective mosaic element. The selection can then be used by the material detection component as an input to activate the corresponding binary filter function for the selected material and visualize all occurrences of the selected material in the image.

Figure 6:
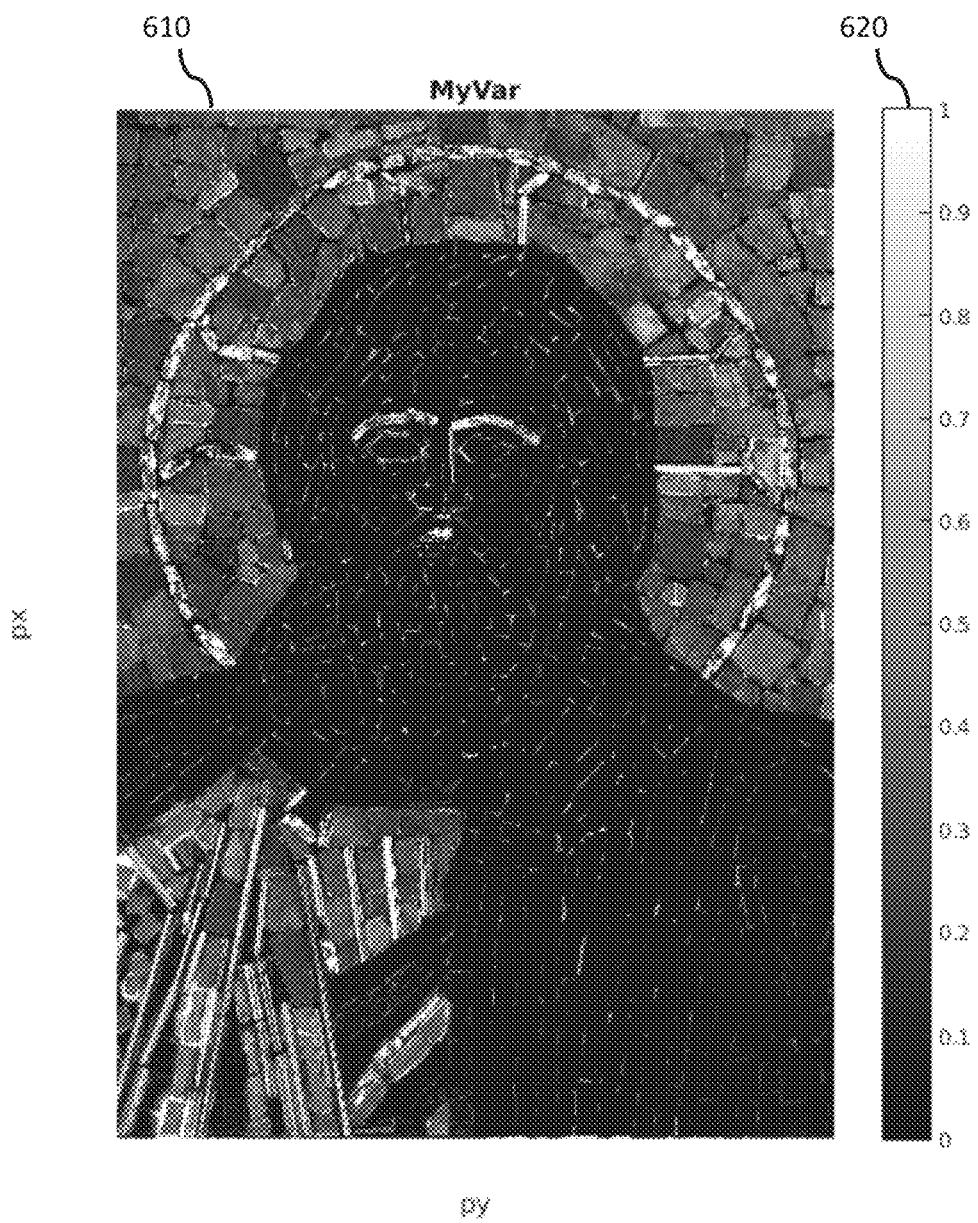
FIG. 6 illustrates an image with a filtering threshold scale for representing the gloss contribution of pixels.

FIG. 6 illustrates an image 610 with a filtering threshold scale 620 for representing the gloss contribution of pixels. The filtering threshold scale 620 illustrates the continuous distribution of the parameter $f_G(x, y)$ representing the amount of gloss for each pixel in the mosaic image 610. In the example, a threshold value is selected which indicates that pixels with a mean L value below the selected threshold are treated as belonging to a glossy part of the image 610. In the example image 610, all pixels having a mean L value above threshold 402 of FIG. 4 are set to zero. As a consequence, for such pixels the glossy coefficients are calculated with a result different from zero. FIG. 6 illustrates how the glossy pixels are then visualized by the rendering component.

Figure 7:
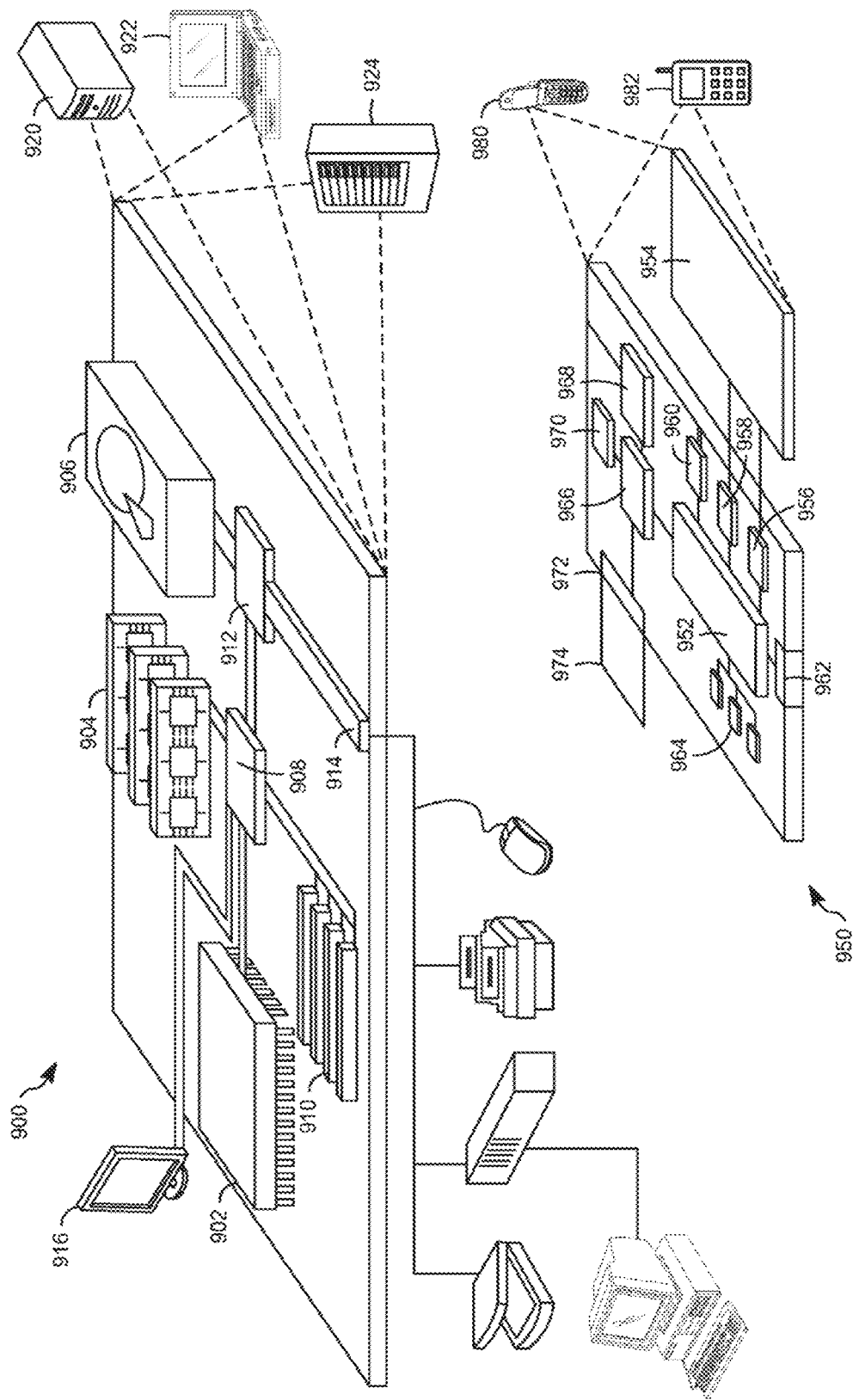
FIG. 7 is a diagram that shows an example of a computer device and a mobile computer device, which may be used with the techniques described here.

FIG. 7 is a diagram that shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computer device may 900 implement the computer system 100 of FIG. 1. Computing device 950 is intended to represent various forms of mobile devices, such as personal digital assistants, cellular telephones, smart phones, and other similar computing devices. For example, computing device 950 may be a smartphone or tablet computer which is used to generate inputs for the rendering component with regards to the illumination angles based on orientation sensor values as disclosed previously. The components shown here, their connections and relationships, and their functions, are meant to be exemplary only, and are not meant to limit implementations of the subject matter described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In some implementations, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other. For example, the client could provide the optional renderer for rendering the target image whereas the other components of the system 100 (cf. FIG. 1) may be implemented on a server.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented image processing method for representation of one or more static objects in a digital target image including a plurality of target pixels, the one or more static objects having surface elements with different surface reflectance properties, the method comprising:
   receiving a plurality of digital source images of the one or more static objects, wherein each source image of the plurality of digital source images represents the one or more static objects under a constant viewing angle and under a different illumination angle;
   computing diffuse components for target pixels of one or more surface elements by computing, for each target pixel of the one or more surface elements, a set of diffuse reflection coefficients from a best-fit function when fitted into reflected light intensity values of corresponding source pixels of the source images under different illumination angles;
   generating normal vectors for the target pixels of the one or more surface elements by using the computed diffuse reflection coefficients, wherein the normal vectors describe spatial orientations of the one or more surface elements;
   determining glossy coefficients for the target pixels of the one or more surface elements as distances between the corresponding best-fit function values and the reflected light intensity values of the corresponding source pixels for the different illumination angles; and
   generating glossy components for the target pixels of the one or more surface elements by overlaying a two dimensional computer graphics reflection model in accordance with the corresponding normal vectors and the determined glossy coefficients.

2. The method of claim 1, further comprising:
   rendering the target image with the computed diffuse components and glossy components for the constant viewing angle and a first illumination angle.

3. The method of claim 2, further comprising:
   re-rendering the target image with the computed diffuse components and glossy components for the constant viewing angle and a second illumination angle.

4. The method of claim 3, wherein rendering and re-rendering is performed by a mobile computing device having one or more orientation sensors, and the first and second illumination angles are derived from first and second sensor data from the one or more orientation sensors, wherein the first and second sensor data is associated with first and second orientations of the mobile computing device, respectively.

5. The method of claim 1, wherein the method is iteratively repeated for at least one further constant viewing angle.

6. The method of claim 1, wherein generating glossy components is performed for target pixels with glossy coefficients exceeding a predefined threshold value.

7. The method of claim 1, further comprising:
   receiving modified reflection parameters for the reflection model wherein the modified parameters reflect the surface reflectance properties of the surface elements.

8. The method of claim 1, wherein the reflection model is selected from any one of the group consisting of: Phong reflection model, Cook-Torrance model, Ward anisotropic model, and Gaussian model.

9. The method of claim 1, wherein the best-fit function is an algebraic or geometric best-fit function selected from the group consisting of: second or higher order polynomial function, conic section function, trigonometric function, Gaussian function, Lorentzian function, and Voigt function.

10. The method of claim 1, further comprising:
    identifying one or more different materials associated with the one or more surface elements wherein similar visual appearance of a material is determined through similar reflectance properties.

11. A non-transitory computer program product for representation of one or more static objects in a digital target image including a plurality of target pixels, the one or more static objects having surface elements with different surface reflectance properties, the computer program product having instructions stored thereon, the instructions, when executed by a processor, cause a computing device to:
    receive a plurality of digital source images of the one or more static objects, wherein each source image of the plurality of digital source images represents the one or more static objects under a constant viewing angle and under a different illumination angle;
    compute diffuse components for target pixels of one or more surface elements by computing, for each target pixel of the one or more surface elements, a set of diffuse reflection coefficients from a best-fit function when fitted into reflected light intensity values of corresponding source pixels of the source images under different illumination angles;
    generate normal vectors for the target pixels of the one or more surface elements by using the computed diffuse reflection coefficients, wherein the normal vectors describe spatial orientations of the one or more surface elements;
    determine glossy coefficients for the target pixels of the one or more surface elements as distances between the corresponding best-fit function values and the reflected light intensity values of the corresponding source pixels for the different illumination angles; and generate glossy components for the target pixels of the one or more surface elements by overlaying a two dimensional computer graphics reflection model in accordance with the corresponding normal vectors and the determined glossy coefficients.

12. The computer program product of claim 11, wherein the instructions when executed by the processor, further cause a computing device to:

render the target image with the computed diffuse components and glossy components for the constant viewing angle and a first illumination angle.

13. The computer program product of claim 12, wherein the instructions when executed by the processor, further cause a computing device to:

re-render the target image with the computed diffuse components and glossy components for the constant viewing angle and a second illumination angle.

14. The computer program product of claim 13, wherein the render and the re-render is performed by a mobile computing device having one or more orientation sensors, and the first and second illumination angles are derived from first and second sensor data from the one or more orientation sensors, wherein the first and second sensor data is associated with first and second orientations of the mobile computing device, respectively.

15. The computer program product of claim 11, wherein the instructions are iteratively repeated for at least one further constant viewing angle.

16. The computer program product of claim 11, wherein generating glossy components is performed for target pixels with glossy coefficients exceeding a predefined threshold value.

17. An image processing computer system for rendering one or more static object representations in a digital target image including a plurality of target pixels, the one or more static objects having surface elements (a, b, c, d, e) with different surface reflectance properties, the system comprising:

an interface component configured to receive a plurality of digital source images of the one or more static objects wherein each source image of the plurality represents the one or more static objects under a constant viewing angle ($\alpha$) and under a different illumination angle ($\beta$);

an image generator component configured to:

compute diffuse components (DC) for target pixels of one or more surface elements (a, b, c, d, e) by computing for each target pixel of the one or more surface elements a set of diffuse reflection coefficients from a best-fit function when fitted into reflected light intensity values of corresponding source pixels of the source images under different illumination angles;

generate normal vectors (NV) for the target pixels of the one or more surface elements (a, b, c, d, e) by using the computed diffuse reflection coefficients wherein the normal vectors (NV) describe spatial orientations of the one or more surface elements;

determine glossy coefficients for the target pixels of the one or more surface elements as distances between the corresponding best-fit function values and the reflected light intensity values of the corresponding source pixels for the different illumination angles; and generate glossy components (GC) for the target pixels of the one or more surface elements (a, b, c, d, e) by overlaying a two dimensional computer graphics reflection model in accordance with the corresponding normal vectors and the determined glossy coefficients; and a rendering component configured to render the target image with the computed diffuse components (DC) and glossy components (GC) for the constant viewing angle (a) and a first illumination angle.

18. The system of claim 17, wherein the rendering component is further configured to: re-render the target image with the computed diffuse components and glossy components for the constant viewing angle and a second illumination angle.

19. The system of claim 18, further comprising:

one or more orientation sensors, wherein the first and second illumination angles are derived from first and second sensor data from the one or more orientation sensors wherein the first and second sensor data is associated with first and second orientations of an associated mobile computing device, respectively.

20. A mobile computing device comprising the system of claim 17, and further comprising:

a material detection component configured to identify one or more different materials associated with the one or more surface elements, wherein similar visual appearance of a material is determined through similar reflectance properties.

* * * * *

UNITED STATES PATENT AND TRADEMARK OFFICE
CERTIFICATE OF CORRECTION

PATENT NO. : 10,643,376 B2
APPLICATION NO. : 16/190856
DATED : May 5, 2020
INVENTOR(S) : Bianco et al.

Page 1 of 1

It is certified that error appears in the above-identified patent and that said Letters Patent is hereby corrected as shown below:

In the Claims

In Column 18, Claim 17, Line 28, delete "(a)" and insert -- (α) --, therefor.

Signed and Sealed this
Twenty-third Day of June, 2020

Andrei Iancu
*Director of the United States Patent and Trademark Office*